(12) United States Patent
Haeusler et al.

(10) Patent No.: US 8,608,234 B2
(45) Date of Patent: Dec. 17, 2013

(54) SUSPENSION DEVICE HAVING ACTIVE WATT LINKAGE

(75) Inventors: Felix Haeusler, Osnabrück (DE);
Andreas Gärtner, Ludwigsburg (DE);
Friedhelm Langhorst, Diepholz (DE);
Matthias Quaing, Emsbüren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 296 days.

(21) Appl. No.: 13/001,251

(22) PCT Filed: Jun. 18, 2009

(86) PCT No.: PCT/DE2009/050032
§ 371 (c)(1),
(2), (4) Date: Jan. 12, 2011

(87) PCT Pub. No.: WO2009/155912
PCT Pub. Date: Dec. 30, 2009

(65) Prior Publication Data
US 2011/0095569 A1    Apr. 28, 2011

(30) Foreign Application Priority Data

Jun. 27, 2008    (DE) .................... 10 2008 002 697

(51) Int. Cl.
*B62D 33/10*    (2006.01)
*B60G 3/12*    (2006.01)
(52) U.S. Cl.
USPC ............................... 296/190.07; 280/124.106

(58) Field of Classification Search
USPC .................. 296/190.07; 280/124.1, 124.107, 280/124.106, 124.14; 267/217, 140.11
See application file for complete search history.

(56) References Cited

U.S. PATENT DOCUMENTS 7,695,054 B2 *  4/2010  Haeusler et al. ......... 296/190.07
7,950,727 B2 *  5/2011  Haeusler et al. ......... 296/190.07

FOREIGN PATENT DOCUMENTS

DE         40 15 947 A1    12/1990
DE    10 2005 043 998 A1     4/2007
EP          0 190 978 A1     8/1986

* cited by examiner

*Primary Examiner* — Joseph Pape
(74) *Attorney, Agent, or Firm* — Davis & Bujold, PLLC; Michael J. Bujold

(57) ABSTRACT

A suspension device for a springy suspension of a mass body relative to an understructure, for instance suspension of a driver cabin of a truck relative to a vehicle chassis. The suspension device comprises a spring-/damping configuration, located between the mass body and the understructure, for the damping shock and/or vibration and comprising a Watt linkage configuration with two parallel positioned Watt linkages. A length of at least one of the linkage arms, of the Watt linkage, is adjustable by an actuator. The suspension device is low-maintenance, free of play, and is suitable for determining of the levels of freedom of motion, for instance of a driver cabin, as well as for damping or eliminating unwanted movement of the driver cabin. At the same time, roll motions of the driver cabin, with respect to the understructure or the chassis, can be actively prevented.

19 Claims, 3 Drawing Sheets

SUSPENSION DEVICE HAVING ACTIVE WATT LINKAGE

This application is a National Stage completion of PCT/DE2009/050032 filed Jun. 18, 2009, which claims priority from German patent application serial no. 10 2008 002 697.2 filed Jun. 27, 2008.

FIELD OF THE INVENTION

The invention concerns a suspension device for a springy or shock absorbing suspension of a mass body, for instance the driver cabin of a truck.

BACKGROUND OF THE INVENTION

Suspension devices as referred to in the beginning are applied, for instance but not exclusively, in trucks or similar heavy-duty vehicles to decouple the driver cabin, in regard to vibrations and movements, from the vehicle chassis. Due to the fact that the spring constant and damping constant of the spring/damping devices of the chassis in heavy-duty trucks are unavoidably high because of the high vehicle loads and because of high springless masses in the chassis, bumps in the road or also vibrations from axles and the drive train are still transferred in a significant proportion via the axle suspension to the chassis and from there to the driver cabin.

To minimize the transfer of such shocks and vibrations, in accordance with the ergonomics and work safety of the driver, to the driver cabin and thus to the workplace of the driver, suspensions for driver cabins have been developed, were the driver cab, or driver cabin, respectively, is supported at the vehicle chassis through its own suspension system. Such suspension systems for the driver cabin can be designed, due to the lower mass of the driver cabin in comparison to the vehicle, with significantly lower spring constants than the axle suspension, a reason why road bumps, or vibrations of the drive train and axles of the vehicle, respectively, are kept away or isolated significantly better from the workplace of the driver due to such cabin suspension systems.

To limit the side roll motion of the driver cabin in such elastic cabin suspension systems, relative to the vehicle chassis, for instance when driving on slopes and curves, but also for instance in the case of bumps on just one side, suspension devices have been designed where a Watt linkage is positioned between the driver cabin and the chassis. The Watt linkage device achieves hereby that spring deflections between cabin and chassis are essentially linear, so that the degrees of freedom of motion between the cabin and the chassis are reduced to vertical spring deflections by means of the Watt linkage device.

Such a suspension device is known, for instance, through DE 10 2005 043 998 A1. This known suspension device comprises in one embodiment two parallel positioned Watt linkages which make sure that the cabin and the chassis of the truck, in regard to roll motions of the truck around the longitudinal axis, are coupled with each other, while a linear spring deflection motion between cabin and chassis, along the vertical axis in the spring deflection, are unrestrictedly possible.

The largely fixed coupling in regard to the roll motions between the cabin and chassis in this known suspension device, however, offers the advantage that self-contained roll motions of the cabin, relative to the chassis, can be eliminated. However, it is inevitable that the driver cab follows every roll motion which is initiated by the chassis. Hereby, the roll angle of the driver cab is equal in size and often—due to the elasticity in the driver cab mounting and the Watt linkages—also larger than the angle of the roll induction which is initiated by the chassis.

Driving on a curve, driving on a slope, or road bumps on just one side, might cause that the driver cab rolls at least equally, if not even more, than the vehicle chassis. Due to comfort and safety reasons it is, however, desirable to at least reduce or eliminate the sideway roll motion of the driver cab in all drive conditions.

SUMMARY OF THE INVENTION

With this background, it is the objective of the present invention to create a suspension device for the springy suspension of a mass body, especially for a suspension of a vehicle cabin for a truck, which can overcome the mentioned disadvantages in this state of the art. In particular, the suspension device shall make it possible to stop unwanted roll motions of the mass body, or the driver cab, respectively, also in the case of roll motions in the understructure, or the chassis.

The inventive suspension device serves, in the known art, for the springy suspension of a mass body, relative to an understructure, thus, for instance, for the suspension of a driver cab of a truck in regard to the vehicle chassis.

Similar to those known in the art, the suspension device comprises a spring/damper configuration, positioned between the mass body and the understructure, for the damping of shocks or vibrations, and in addition, a Watt linkage configuration with two parallel positioned Watt linkages, connecting the mass body and the understructure for a relative motion. The Watt linkages serve for reducing the degrees of freedom of motion of the mass body, in reference to the understructure, especially for the mainly linear guidance of the mass body along the main shock direction of the understructure.

In accordance with the invention, the suspension device distinguishes itself by the fact that at least one of the linkage arms of the Watt linkage is designed in a way so that it can be adjusted in length. The length change of the arm in the Watt linkage takes place by means of an actuator.

The inventive adjustability of the length of at least one of the arms in a Watt linkage of the suspension device enables unwanted roll motion angles of the mass body, for instance an unwanted sideway roll motion of the driver cab of a truck, to be counteracted by changing the length of one of the arms in a Watt linkage by means of an actuator.

This means, in other words, that the angle between the mass body and the understructure, thus for instance between the driver cab and the chassis, can be actively adjusted to maintain, for instance in the case of a sideway roll motion of the chassis, the vertical position of the driver cab, or to keep the roll motion of the driver cabin smaller than that of the chassis.

The invention can initially be realized, independently from the manner in which changing of the length of the arm is performed, as long as in each application the required forces can be generated by means of a respective actuator. For instance, changing the length of the arm can be achieved through pressured air or by means of an electric drive. In accordance with a special, preferred embodiment of the invention, the change of the length of the arm, however, is achieved by means of a hydraulic actuator. The advantage of a hydraulic actuator is that large activating forces can be generated in a small space and that the desired change of the length of the arm can be exactly maintained, due to the incompressibility of hydraulic oil.

In the first instance, it is not important in this invention how the two parallel Watt linkages are constructed and how they are positioned between the understructure and the mass body, as long as the expected loads can be accommodated, and as long as, due to the distance of the Watt linkages, an appropriate lever arm is formed for the transfer of the generated roll torque.

In accordance with an additional, preferred embodiment of the invention, the joints of the two Watt linkages are present in a common plane of motion. This means in other words that the joint of the two Watt linkages are constructed in a way so that the positions of all joints span the so-called plane of motion, or all joints of the two Watt linkages are positioned mainly in the same plane.

This embodiment is advantageous since tensions can hereby be avoided, or the generation of secondary torque, which can occur due to any distances between the levels of motion of the two Watt linkages, can be eliminated.

In accordance with another embodiment of the invention, the two Watt linkages, in reference to their common linear guide direction, are positioned in a sideway offset. This embodiment allows an especially space saving and compact positioning of the two Watt linkages, and also expands the constructive design possibilities in regard to the shapes and the positioning of the Watt linkages.

In a further preferred embodiment, the fastening point, or bearing point, respectively, of the central Watt arm which belongs to the first Watt linkage, is connected with the mass body, but the fastening point, or bearing point, respectively, of the Watt arm which belongs to the second Watt linkages, are connected with the understructure.

Thus, the Watt linkages or rather arms, which form the Watt linkages, can even be positioned even more compactly or interlaced to a certain extent. This leads to an especially compact design of the Watt linkage configuration with an even better use of the available installation space.

A further preferred embodiment of the invention provides that the distance of the hinge connection points of the two central Watt linkage arms is larger than the respective distances of the outer hinge connection points of the two Watt linkages, assigned to the Watt linkage transversal struts. This means in other words that the imaginary connection lines between the six hinge connection points of the two Watt linkages do not form a parallelogram, like in the previous embodiments, but instead they form a double trapezoid because the distances between the outer hinge connection points of the two Watt linkages in this embodiment are smaller than the distances of the two central hinge connection points.

Thus, this embodiment leads to an extension of the created lever arm, due to the distance of the hinge connection points on the two central Watt handlebar arms. This extended lever arm can hereby be better used for the accommodation of torque, for instance the roll torque of a driver cab.

This also creates the advantage that, with a given torque or rather roll motion torque, only reduced forces—reciprocally proportional to the extended length of the central lever arm—have to be transferred via the Watt linkage configuration. Hereby, a lesser and therefore lower mass dimensioning of the Watt linkage becomes possible, but whereby simultaneously the considerable torque—for instance in the roll motion support for a driver cabin—can be transferred in an unchanged manner via the Watt linkage configuration and passed into the understructure, for instance the chassis of a truck. Thus, and in addition, also the remaining roll motions caused by unavoidable elasticity—for instance in the area of the Watt linkages, in the area of the hinge connecting points of the Watt linkages at the mass body or rather understructure, or due to the flexibility of an elastomeric bearing—can be reduced due to the lower forces which have to be transferred.

In accordance with an additional, especially preferred embodiment of the invention it is also provided that the outer hinge connection points, assigned to the transversal struts of the two Watt linkages, are each positioned as pairs in a common swivel axis of both Watt linkages. This means in other words that the distance of the outer hinge connection points between the two Watt linkages, in this embodiment, is not only reduced to a certain extent, like in the previous embodiment, but that this distance equals zero in this case. Hereby, the outer hinge connection points of the transversal struts of the two Watt linkages share just two hinge axes, instead of the previous need for four hinge axes.

Thus, parts are saved and therefore also costs are reduced. In addition, this Watt linkage configuration can be constructed especially compact and space saving, and the configuration now needs just only two, instead of previously four, frame connection points. Since the forces at the connection points of the frame, created by the two Watt linkage arms in this configuration, compensate each other due to vector addition, the connecting parts at the frame can be designed as having less weight and therefore more cost-effective. Also, reduced stiffness through elastomeric bearings can be applied when elastomeric bearings are used, which promises a better sound isolation.

The latter is mainly the case when the bearing of each of the two, outer hinge connection points, merging with the transversal struts of the Watt linkage, is initially designed as non-elastic on a common hinge connection axis—for the purpose of the vector force addition, while the common hinge connection axis, by itself, is attached to the respective connection points at the frame.

In accordance with an additional embodiment of the invention it is also provided that the two transversal struts of the Watt linkages, in the section of their outer hinge connection point and on a common hinge connection axis, are each designed as a single piece and in the shape of, for instance, a V-shape combination strut. This embodiment where two, commonly hinged, transversal struts each form a part similar to a triangle shaped arm, causes additional constructive simplifications, whereby the quantity of needed parts is further reduced.

In particular, there is no need to have four—like in the previous embodiments—but just only two hinge bearings for the connection of the outer hinge connection points of the transversal struts. Thus and in addition, both Watt linkages of this combined Watt linkage assembly can be positioned, without any problem, mainly in the same plane, which again saves installation space. In this embodiment, the induced forces into the respective connecting parts at the vehicle chassis are lower due to partial, vector force cancellation, resulting again in the recent mentioned advantages in regard to weight and cost, or in regard to the application of elastomeric bearings for possible sound isolation.

It is provided in additional embodiments of the invention that at least one of the bearing points, preferably however several or rather all bearing points of the Watt linkage configuration, are designed as elastomeric bearings, or that the hinge connection axis of commonly hinged or single piece transversal strut pairs are elastically linked to the mass body or understructure.

The design of one or several hinge connection points, or even all hinge points of the Watt linkage configuration as an elastomeric bearing has the particular advantage that the suspension device can be designed as especially robust and resistant, whereby at the same time the maintenance requirement is reduced to a minimum. Also, the result is additional vibration damping in the micro range, which reduces the bearing stress as well as the material stress, and also—especially in the case of an application in vehicles—it further improves the available comfort with the suspension device.

The elastic connection of the hinge axes of commonly hinged transversal strut pairs results in the already above mentioned, additional advantage whereby here—through the common linkage of the transversal strut pairs—initial partial, vector cancellation of the pull forces or compressive forces which are present in the transversal struts, can take place even before now just the remaining residual forces, which are much lower in value, need to be introduced into the understructure or the mass body.

Finally, the application of elastomeric bearings can prevent, under certain suspension conditions, structural tensions that may occur in the Watt linkages, and tolerances in the manufacturing, or canting during operation can be better dealt with.

It is provided, in accordance with an additional embodiment of the invention, that the suspension device comprises not just one but several Watt linkage configurations. Hereby—initially independent of the specific, constructive design and positioning of the Watt linkages—improved guidance accuracy, better strength, as well as an increase in safety can be achieved, especially in the case of the application in a vehicle construction environment.

Hereby, the spanned planes of motion of one of the Watt linkage configurations are preferably positioned vertically in reference to the hinges of the spanned planes of motion of an additional Watt linkage configuration. This means in other words that at least two Watt linkage configurations are applied and the respective Watt linkages are positioned vertically in reference to each other. Thus, the degree of freedom of motion of the mass body—for instance of a vehicle cabin—can be limited effectively to movements in just one spatial direction (for instance along the vertical, main shock direction of the chassis), while movements in the two other spatial directions are excluded. Also, unwanted rotations of the mass body around at least two axes of the Cartesian coordinate system, meaning for instance roll motion as well as pitch motion of a vehicle cabin, can hereby be reliably eliminated.

BRIEF DESCRIPTION OF THE DRAWINGS

In the following, the invention is further explained in detail by the embodiment examples in the drawings. It shows.

DETAILED DESCRIPTION OF THE PREFERRED EMBODIMENTS

Figure 1:
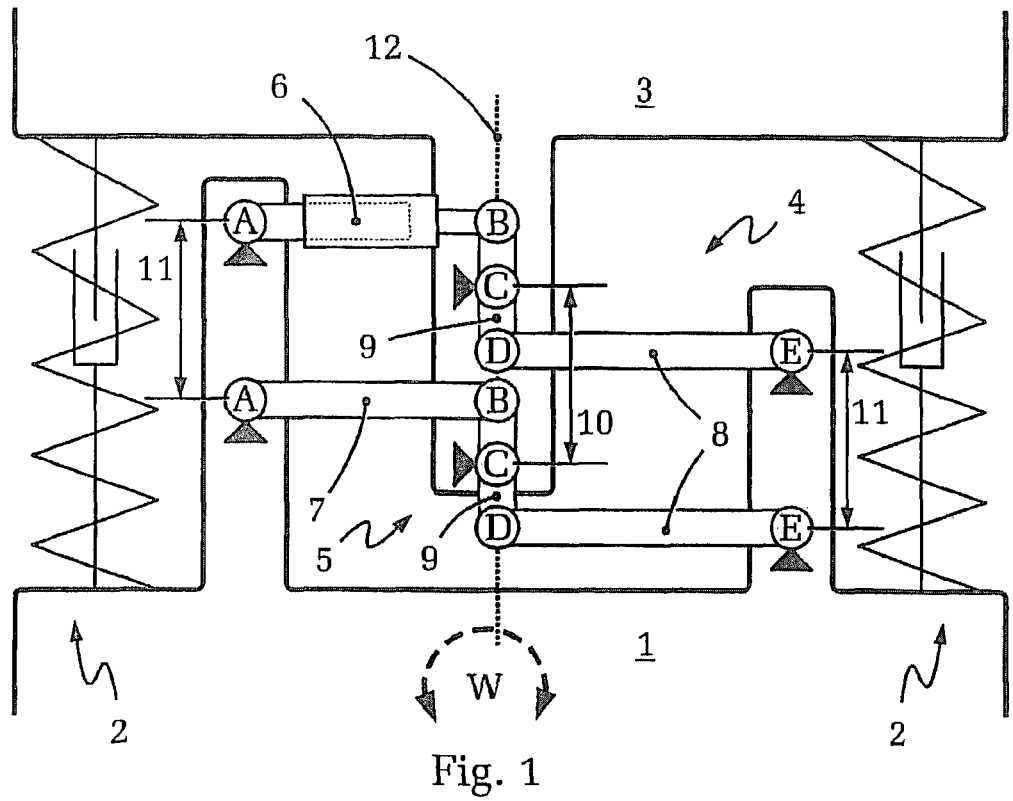
FIG. 1 in a schematic presentation an embodiment of a suspension configuration in accordance with the invention, in the neutral position.

FIG. 1 shows in a highly schematic presentation an embodiment of a suspension configuration in accordance with the present invention. One can see initially the understructure 1, and a schematically indicated mass body 3 which is connected with the understructure 1 via a spring-/damper-configuration 2. Hereby, the understructure, in this presented embodiment, represents the front section of the chassis 1 of a truck, while the indicated mass body represents the driver cab 3. The drive direction is hereby perpendicular to the drawing plane.

It can be seen in FIG. 1 that the connection between the driver cab 3 and the chassis 1, beside two spring-/damper-devices 2, comprises two Watt linkages 4, 5. It can be seen that each of the Watt linkages 4, 5 comprises five hinges which are identified by the reference characters A, B, C, D, E. With regard to the hinges A to E, in the presented embodiment, A and E are fixed to the frame, whereby each C is fixed to the driver cab. The hinge points A to E of each Watt linkage are hereby connected through a configuration with two transverse struts 6, 7, 8 and a central Watt linkage arm 9.

Due to the special—known by itself—kinematics of the Watt linkage 4, or 5, respectively, in accordance with FIG. 1, the lateral motions of the driver cabin 3, relative to the chassis 1, are hereby supported via the hinges A, C, and E of the two Watt linkages 4, 5, while the relative motions of the driver cab 3 and the chassis 1 are allowed unhindered by the Watt linkages 4, 5, along the vertical direction.

In this case because the center connecting point C of the respective Watt linkage arm 9, due to its guidance from its assigned transversal struts 6, or 7 and 8, respectively—which hereby need to have the same length, while the outer hinge connection points A and E have a vertical distance 11, which corresponds to the length of the Watt linkage arm 9—cannot deviate from the vertical line of motion as indicated by the dotted line 12 in the FIG. 1. Hereby, the driver cab 3 and the chassis 1 are initially kept constant in the shown position which is, in reference to each other, on top of each other. A relative transversal motion of the driver cab 3, relative to the chassis 1, does not occur.

If static or dynamic transversal forces occur, they are hereby immediately transferred via the transversal struts 6, or 7, respectively, via the Watt linkage arm 9, as well as via the hinges A to E between the driver cab 3 and the chassis 1, so that—at least in the section of the Watt linkages 4, or 5, respectively, in this present embodiment for instance in the rear section of the driver cab 3—no additional lateral guidance or support for the driver cabin 1 is required. The vertical motion between driver cab 3 and the chassis 1 remains hereby, due to the free, vertical motion of the respective Watt linkage arm 9, completely unhindered and is, as intended, just accommodated, or absorbed, respectively, through the spring-/damper-configurations 2.

The Watt linkages shown on the drawings each comprise hereby two separate Watt linkages 4 and 5, their respective linear guidance 12 (dotted line in FIG. 1) matching, and its planes of motion, determined by the position of the linkage arms 6, 7, 8, or hinge points A to E, respectively, running parallel to each other and, in this present embodiment, matching approximately the plane of the drawing.

Figure 2:
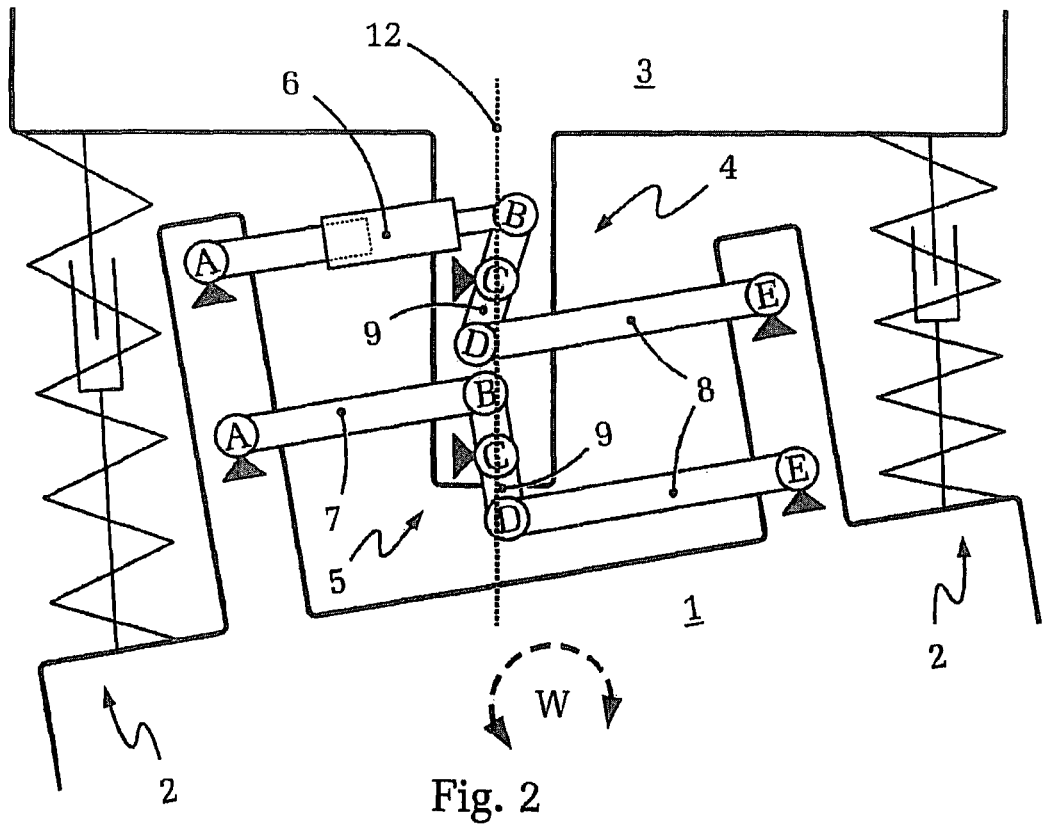
FIG. 2 a respective presentation as in FIG. 1 and the suspension device in accordance with FIG. 1, in the activation position in case of a roll motion.

Such Watt linkage configurations, presented in the drawings, with two, vertically distanced Watt linkages 4 and 5, have the particular advantage that not only linear guidance of the driver cabin 3, relative to the chassis 1, can be achieved but that also hereby stabilization of rotational motions—in reference to the rolling motions W according to FIG. 2—can take place.

This is because the two Watt linkages 4 and 5, positioned in accordance with FIG. 1 to FIG. 5 at a vertical distance 10 from each other between chassis 1 and driver cabin 3, are not limited—as in a single Watt linkage—to transfer only transversal forces. In addition, and due to the vertical distance 10 between the two Watt linkages 4 and 5 which acts as a lever arm, torque can also be transferred which occurs around the longitudinal axis of the vehicle, which are shown as the rolling motions W in FIGS. 2 to 5.

This means in other words that the driver cabin 3, in the present embodiments, can initially perform just the (desired) vertical compensation motions along the dotted line 12, relative to the chassis 1, but that lateral relative motions or rather rotation W of the driver cabin 3, relative to the chassis 1, can be stopped due to the Watt linkage configuration 4, 5.

This, however, and as described earlier, results in the connection of the chassis 1 and driver cabin 3 being essentially fixed, such that with regard to roll torque or rather roll motions W, when the chassis is in a tilted position, the driver cabin—perhaps undesirably—also moves into the tilted position.

This problem is solved, in accordance with the invention, in a way that at least one of the linkage arms of the Watt linkage configuration is designed so that its length can be adjusted by means of an actuator. In the illustrated embodiment, this is the linkage arm 6 of each of the upper Watt linkages 4. It can be seen from the schematic illustrations of the FIGS. 1 to 5 that the length adjustable linkage arm 6 contains a hydraulic element which facilitates adjustment of the linkage arm 6 to its effective length.

FIG. 2 shows the effect of adjusting the length of the linkage arm 6 in reference to the configuration of chassis 1 and driver cabin 3. In FIG. 2 the chassis 1 is in a tilted position, for instance due to sloped driving or driving around curve. Despite the tilted position, to keep the driver cabin 3 in an upright, horizontal position, the hydraulic length adjustable linkage arm 6 of the upper Watt linkage 4 is accordingly actuated so as to effectively extend the length of the length adjustable linkage arm. This results in a situation as illustrated in FIG. 2, in which the performed parallel guidance, achieved through the two Watt linkages 4 and 5 between chassis 1 and the driver cabin 3, is repositioned by the corresponding angle of the chassis 1 in the tilted position.

Hereby, maintaining the driver cabin 3 in the horizontal position can be ensured also in situations where the chassis 1 is tilted in a tilted position, the central hinge points C of the Watt linkages can maintain their vertical position above each other, compare the dotted line 12 in FIG. 2.

Figure 3:
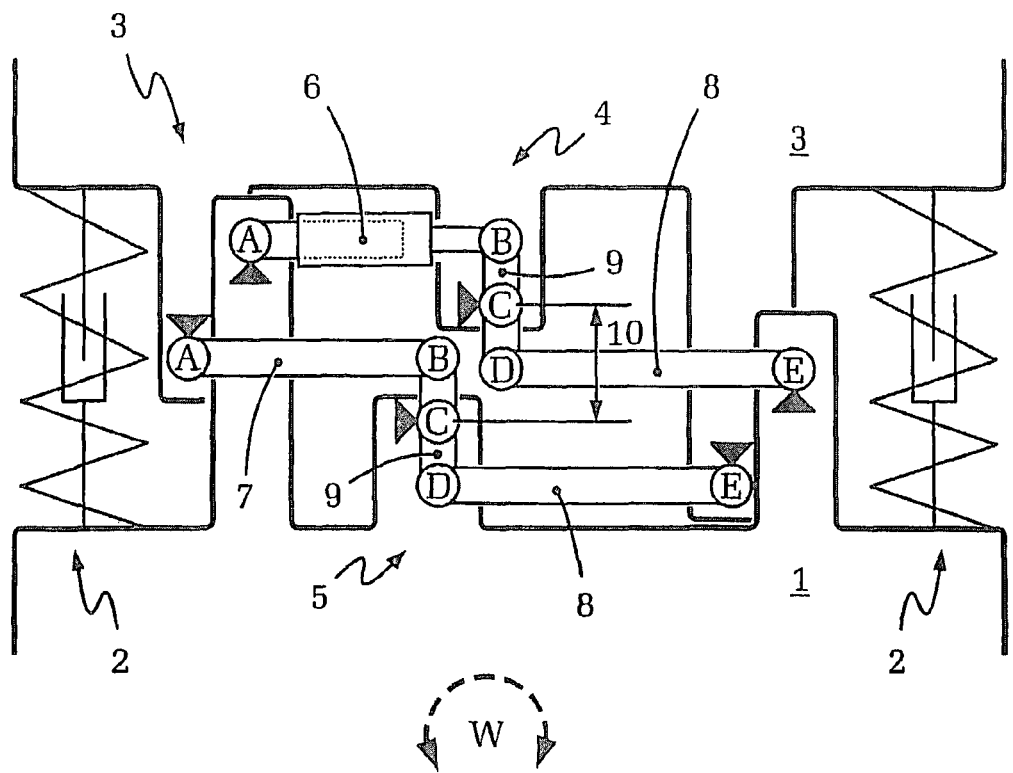
FIG. 3 a respective presentation as in FIGS. 1 and 2 and the view of a suspension device in accordance with an additional embodiment.

FIG. 3 shows an additional embodiment of the inventive suspension device with two Watt linkages. The suspension device, in accordance with FIG. 3 initially differs from the suspension device in accordance with FIGS. 1 and 2, in that the two Watt linkages 4 and 5 in the embodiment according to FIG. 3 are laterally offset, or are positioned offset to the transverse direction of the vehicle. Also, in the embodiment according to FIG. 3, the Watt linkage arm 9 in this drawing of the upper Watt linkage 4—as initially in the embodiment according to FIGS. 1 and 2—is with connected at its hinge point C to the driver cabin 3, however the Watt linkage arm 9, of the lower Watt linkage 5 is connected in this case to the chassis 1. These two differences with regard to FIGS. 1 and 2 cause the Watt linkages in the embodiment according to FIG. 3 to interlace with each other such that they can be positioned in an especially space saving manner.

Figure 4:
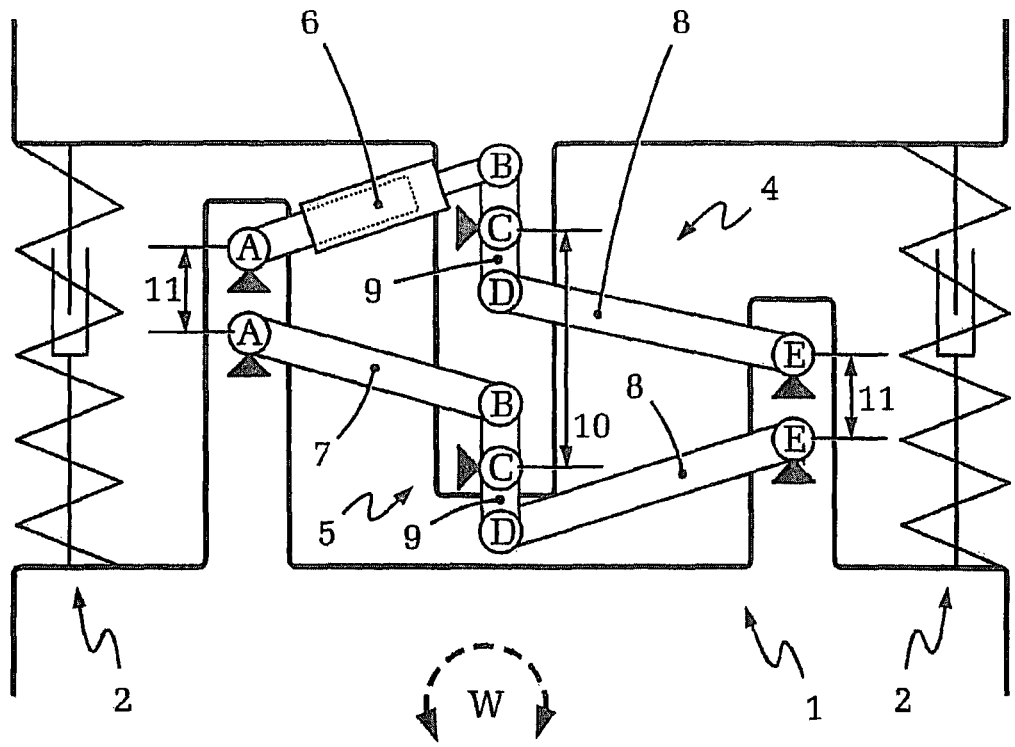
FIG. 4 a respective presentation as in FIGS. 1 to 3 and the view of a suspension device in accordance with a third embodiment.
Figure 5:
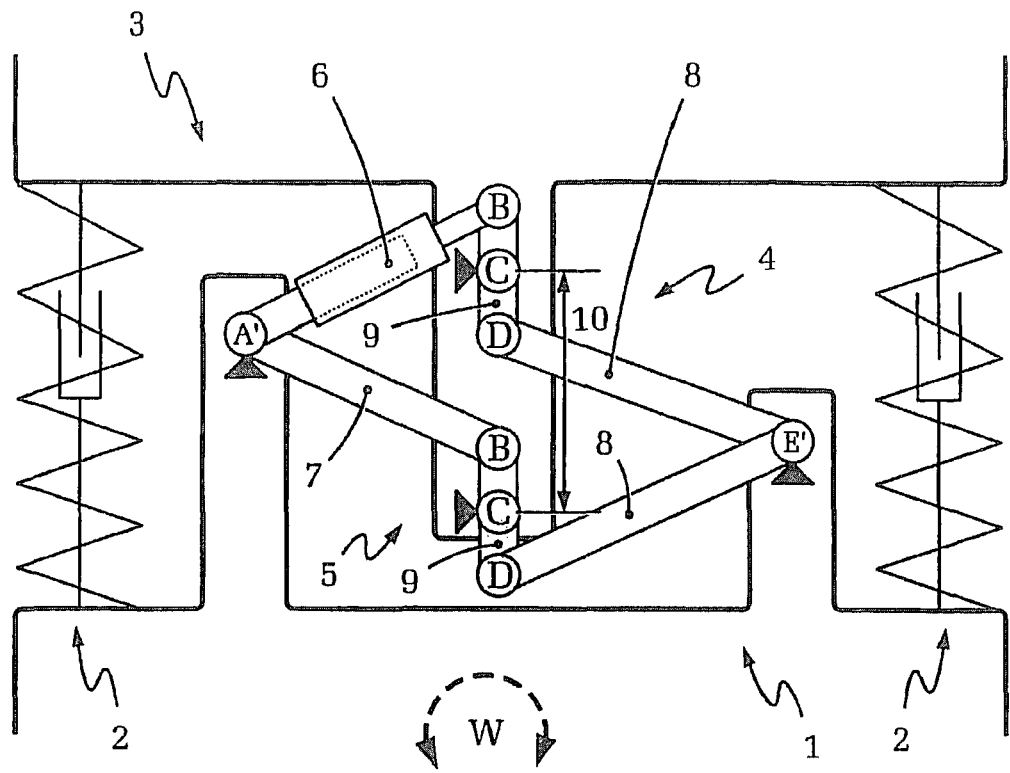
FIG. 5 a respective presentation as in FIGS. 1 to 4 and a view a suspension device in accordance with a fourth embodiment of the invention.

Additional embodiments of suspension devices, for instance for driver cabins, are illustrated in FIGS. 4 and 5. The basic principle of the illustrated embodiments is the same as the previous embodiments according to FIGS. 1 and 2. The embodiments in accordance with FIGS. 4 and 5 differ from the embodiments in FIGS. 1 and 2 in that the distance 10 between the hinge points C of the two Watt linkage arms 9 in the embodiment according to FIGS. 4 and 5 is larger than the distances 11 (FIG. 4) between the outer hinge points A, E of the two Watt Linkages 4 and 5, assigned to the transversal struts 6, 7, 8.

Figure 6:
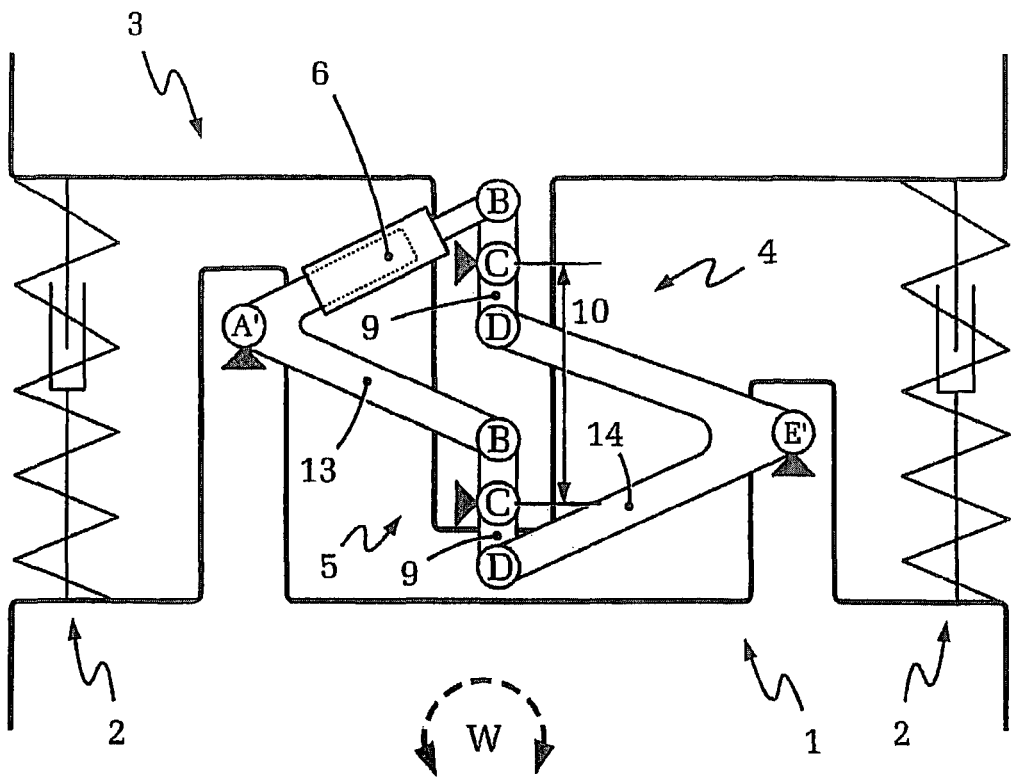
FIG. 6 a respective presentation as in FIGS. 1 to 5 and a view of a suspension device in accordance with a fifth embodiment having one-piece transversal strut pairs.

The applicant has found that these special geometric conditions, in the embodiments in accordance with FIG. 5, or FIG. 6, respectively, have no negative effect in regard to the functionality of the Watt linkages. This means in particular that the desired linear guidance of the Watt linkages, or the linear guidance of the central hinge points C, respectively, are also fully maintained in these embodiments.

There is an advantage, on the other hand, that the lever arm 10, due to the increased distance 10 between the central hinge points C of the two Watt linkage arms 9, is increased proportionally to the increased distance 10 between these two hinge joints C. This causes the roll motion torques W, induced via the chassis 1 or the driver cabin 3, to result in similarly proportionately smaller reactive forces, which apply to the effective forces within the Watt linkages 4 and 5, as well as to the forces which are induced via the hinge joints C into the driver cabin 3.

In other words, the Watt linkages 4 and 5, due to the embodiments according to FIGS. 4 and 5 and also their mounting C at the driver cabin 3, can have less rigid dimensions and therefore they can have a smaller mass.

The Watt linkage configuration according to FIG. 5 differs from the embodiment according to FIG. 4 insofar, that the outer hinge joints of the two Watt linkages 4, 5, assigned to the transversal struts 6, 7, 8, are each present as pairs on one of the Watt linkages 4 and 5 at a common hinge connection axis A' to E'. This means in other words that the distance of the outer hinge points pairs A, or E, respectively, between the two Watt linkages 4 and 5 in this embodiment, is not reduced by a certain amount—as is the distance 11—as in the previous embodiment according to FIG. 4, but that this distance according to the embodiment in FIG. 5 is equal to zero. Hereby, the outer hinge joint pairs A, or E, respectively, of the transversal struts 6, 7, and 8 of the two Watt linkages 4, 5 share in total just two hinge connection axes at A' and E', instead of the requirement as in the embodiments according to FIG. 1 to FIG. 4 of four hinge connection axes (two times A, two times E).

Fewer parts are hereby needed, in particular linkages to the frame, or chassis, as well as bearing axes, and therefore costs are saved. In addition, the Watt linkage configuration can hereby be designed very compactly such that valuable installation space can be saved.

Finally, FIG. 6 shows an additional embodiment in accordance with the inventive suspension device with a Watt linkage configuration 4, 5. The illustrated Watt linkage configuration in FIG. 6 is mainly based on the Watt linkage configuration in accordance with FIG. 5. However, the embodiment in FIG. 6 differs from the embodiment in accordance with FIG. 5 insofar that in the Watt linkage configuration in accordance with FIG. 6, the two separate transversal struts 6, 7, 8 of the two Watt linkage pairs and are formed in one piece as a combination strut 13, or 14, respectively, where previously in FIG. 5 they are linked at a common hinge connection axis A', or E', respectively.

This embodiment, in which the commonly linked transversal struts form a part like a triangle linkage 13, 14, similar to a V-shape, possess additional constructive simplifications, as well as additional advantages. First, the number of required parts is further reduced significantly. In particular, four outer hinge bearings for the four transversal struts are no longer required, now only two bearings are required to link the outer hinge connection points A', E' of the two combinations struts 13, 14. In addition, the particularly combined Watt linkages 4, 5 can be positioned in one of the same space plane, which saves even more installation space. Finally, the present pull forces and compressive forces, which are present within the Watt linkage configuration, partially compensate each other and do not have to pass first via the connection to the chassis, or driver cabin, respectively.

The active roll motion suppression, due to the length adjustable linkage arm 6, is also maintained as in the embodiments in accordance with FIGS. 3 to 6, as described in reference to FIGS. 1 and 2.

The result makes it clear that, due to the invention, a suspension device for springy suspension of a mass body, for instance the driver cabin of a truck, has been created in which the desired vertical degree of freedom of movement of the driver cabin, can be space saving, as well as constructively robustly, designed. At the same time, unwanted roll motions of the mass body, or driver cabin, respectively—also in the case of roll motions created by the understructure, or chassis, respectively—can be stopped. Thus, the invention enables hereby a simply constructed, active roll motion suppression, in particular for driver cabins and suchlike.

REFERENCE CHARACTER LISTING

1 Substructure, Chassis
2 Spring-/Damper Configuration
3 Mass Body, Driver Cab
4, 5 Watt Linkage
6 Transversal Strut, actuator adjustable linkage arm
7, 8 Transversal Struts
9 Watt linkage arm
A to E Joints, Connecting Points
A', E' Hinge Connection Points, Hinge Connection Axes
W Roll Motion, Roll Torque
10 Distance, Lever
11 Distance
12 Linear Guide
13, 14 Combination Strut, Triangular Suspension Arm

The invention claimed is:

1. A suspension device for a springy suspension of a mass body (3) relative to an understructure (1), the suspension device comprising:
  a spring/damper-configuration (2), positioned between the mass body (3) and the understructure (1), for damping at least one of shock and vibration;
  the suspension device comprising a first Watt linkage configuration with parallel positioned first and second Watt linkages (4, 5), each comprising a central strut and first and second transverse struts, interconnecting the mass body (3) with the understructure (1) for reducing a degree of freedom of motion of the mass body (3) relative to the understructure (1), and a central hinge point (C), of each of the first and the second Watt linkages (4, 5), being vertically displaceable in relation to two outer hinge points (A, E) of each of the first and second Watt linkages (4, 5);
  the first transverse strut (6) of the first Watt linkage (4) having an actuator for adjusting a length of the first transverse strut (6).

2. The suspension device according to claim 1, wherein the actuator is a hydraulic actuator.

3. The suspension device according to claim 1, wherein the actuator is a pneumatic actuator.

4. The suspension device according to claim 1, wherein the actuator is an electrically driven actuator.

5. The suspension device according to claim 1, wherein the first and the second Watt linkages (4, 5) each have hinge connection points (A, B, C, D, E) that lie in and define a common plane.

6. The suspension device as claim 1, wherein the first and the second Watt linkages (4, 5), in reference to a common linear guidance direction, are positioned with an offset with respect to a transverse direction of the vehicle.

7. The suspension device according to claim 1, wherein a connection point of a first central Watt linkage arm (9) of the first Watt linkage (4) is connected with the mass body (3), and a connection point of a second central Watt linkage arm (9) of the second Watt linkage (5) is connected with the understructure (1).

8. The suspension device according to claim 5, wherein a distance (10) between connection points (C) of first and second central Watt linkage arms (9) of the first and the second Watt linkages (4, 5) is greater than a distance (11) between two adjacent outer hinge connecting points (A, E) of the first or the second transverse struts (6, 7, 8) of the first and the second Watt linkages (4, 5).

9. The suspension device according to claim 1, wherein the two outer hinge connection points, which are assigned to transverse struts (6, 7, 8) of the first and the second Watt linkages (4, 5), are each positioned as pairs in one of common hinge connection axes (A', E') of the first and the second Watt linkages (4, 5).

10. The suspension device according to claim 9, wherein the transverse struts of the first and the second Watt linkages (4, 5) are positioned in a common swivel axis and designed as a one piece combination strut (13, 14).

11. The suspension device according to claim 1, wherein at least one of the first and the second Watt linkages (4, 5) has at least one hinge connecting point (A, B, C, D, E) which is an elastomeric bearing.

12. The suspension device according to claim 10, wherein a hinge connection axis (A', E') of either a commonly hinged or a single piece transversal strut pair are elastically attached to one of the mass body (3) and the understructure (1).

13. The suspension device according to claim 1, wherein the suspension device comprises a second Watt linkage configuration which has parallel positioned first and second Watt linkages (4, 5), whereby a plane of motion of the first Watt linkage configuration is positioned vertically in reference to a plane of motion of the second Watt linkage configuration.

14. The suspension device according to claim 1, wherein the mass body (3) is a driver cabin of a truck.

15. The suspension device according to claim 1, wherein the understructure (1) is a vehicle chassis.

16. A suspension device for a springy suspension of a mass body (3) relative to an understructure (1), the springy suspension comprising a spring/damper-configuration (2) that is positioned between the mass body (3) and the understructure (1) for damping at least one of shocks and vibrations, the suspension device comprising:
  a Watt linkage configuration with parallel positioned first and second Watt linkages (4, 5) interconnecting the mass body (3) and the understructure (1) for a reduced degree of freedom of motion of the mass body (3) with respect to the understructure (1), and the first Watt linkage (4) comprising first and second transverse struts and a central and the first transverse strut (6) of the first Watt linkage (4) being alterable in length by an actuator.

17. A suspension device for springy suspension of a driver cabin (3) of a truck relative to a vehicle chassis (1), the suspension device comprising:

a spring and damper configuration (2) interconnecting the driver cabin (3) with the vehicle chassis (1) for damping a transfer of at least one of shock and vibration from the vehicle chassis (1) to the driver cabin (3);

a Watt linkage configuration being positioned between the driver cabin (3) and the vehicle chassis (1) for reducing a degrees of freedom of motion of the driver cabin (3) with respect to the vehicle chassis (1), the Watt linkage configuration comprising first and second Watt linkages (4, 5) which each interconnected to the driver cabin (3) with the vehicle chassis (1), each of the first and the second Watt linkages (4, 5) comprising first and second transverse struts (6, 7, 8), a central linkage arm (9) and a plurality of connection points (A, B, C, D, E);

the first transverse strut (6) of the first Watt linkage (4) being connected, via a first outer connection point (A), to the vehicle chassis (1), and, via a first inner connection point (B), to the driver cabin (3), and the second transverse strut (8) of the first Watt linkage (4) being connected, via a second outer connection point (A), to the vehicle chassis (1), and, via a second inner connection point (B), to the driver cabin (3), and a length of the first transverse strut (6) of the first Watt linkage (4), between the first outer connection point (A) and the first inner connection point (B), being adjustable by an actuator; and the first transverse strut (7) of the second Watt linkage (5) being connected, via an other first outer connection point (A), to the vehicle chassis (1), and, via another first inner connection point (B), to the driver cabin (3), and the second transverse strut (8) of the second Watt linkage (4) being connected, via an other second outer connection point (A), to the vehicle chassis (1), and, via an other second inner connection point (B), to the driver cabin (3), and a length of the first transverse strut (7) of the second Watt linkage (5), between the other first outer connection point (A) and the other first inner connection point (B), being fixed.

18. The suspension device according to claim 17, wherein the linkage arm (9) of each of the first and the second Watt linkages (4, 5) is connected, via a central connection point (C), to the driver cabin (3) and, via the inner connection point (B) and the other inner connection point (B), to the first transverse strut (6, 7) of the respective first and the second Watt linkages (4, 5), a distance (10) between the central connection points (C) of the respective first and the second Watt linkages (4, 5) is greater than a distance (11) between the inner connection point (B) of the first Watt linkage (4) and the other inner connection point (B) of the second Watt linkage (5).

19. The suspension device according to claim 17, wherein that the outer connection point (A) of the first Watt linkage (4) and the other outer connection point of the second Watt linkage (5) are a common outer connection point (A') and the first transverse struts (6, 7) of the first and the second Watt linkages (4, 5) are rigidly connected to each other at the common outer connection (A').

\* \* \* \* \*